UNITED STATES PATENT OFFICE.

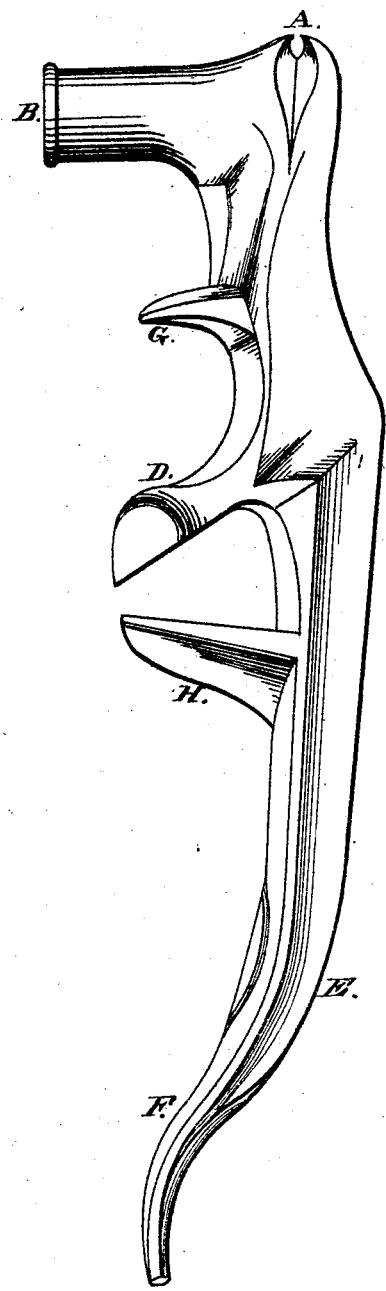

JOHN GRANT, OF GANANOQUE, CANADA.

IMPROVEMENT IN POT-TILTERS.

Specification forming part of Letters Patent No. 147,255, dated February 10, 1874; application filed May 16, 1873.

*To all whom it may concern:*

Be it known that I, JOHN GRANT, of Gananoque, in the county of Leeds, in the Province of Ontario and Dominion of Canada, have invented a new and useful Implement for Tilting Pots, and holding the cover in place while doing so, to which is attached a hammer, a tack-puller, and a stove-cover lifter. The following is a full and exact description of the operation thereof, reference being had to the annexed drawing.

The drawing accompanying this specification represents the combined pot-tilter and cover-holder in perspective.

The notch A at the top of the hammer B shows the tack-puller. The tack-puller is cam-shaped on the back, which cam acts as a fulcrum and gives you sufficient power. The hammer B is used by taking hold of the end of the machine, marked E, in your hand, with its right side up. You can then drive a nail with freedom and power.

To use the implement as a pot-tilter, with one hand place the implement on the pot, allowing the edge of the pot to project upward between the jaws H and D; then take the bail of the pot in your other hand; then move the implement laterally until the jaws H and D impinge on the pot, at the same time allowing the end of the arm F to rest on the cover of the pot; then balance the pot with the implement and the bail of the pot; then push it over with the implement, or lean it on the ground or anything that is convenient, and push it over.

Similar effects might be attained by other devices, such as putting a set-screw in the jaw D, and setting it up until it would clamp the pot; or by having an eccentric, with a lever-arm, attached to the jaw D; or in other ways that might be named.

E is the stove-cover lifter. To use it, grasp the implement by the neck in front of the hammer B, putting the forefinger in front of the crank-pin C, and you can lift the stove-cover easily and expeditiously.

I claim—

The jaws H and D, suited to the inner and outer sides of the pot, so that by lateral movement they will impinge on it, combined with the arm F to bear on the cover, the whole operating as a lever or handle to tilt the pot, and at the same time to hold the cover in place.

JOHN GRANT.

Witnesses:
 J. W. CUNNINGHAM,
 HUGH McCRANE.